(12) United States Patent
Libinson

(10) Patent No.: US 9,193,157 B2
(45) Date of Patent: Nov. 24, 2015

(54) CONTROLLING DENSITY OF DISPENSED PRINTING MATERIAL

(75) Inventor: Alexander Libinson, Holon (IL)

(73) Assignee: STRATASYS LTD., Rehovot (IL)

( * ) Notice: Subject to any disclaimer, the term of this patent is extended or adjusted under 35 U.S.C. 154(b) by 0 days.

(21) Appl. No.: 14/344,522

(22) PCT Filed: Sep. 13, 2012

(86) PCT No.: PCT/IL2012/050367
§ 371 (c)(1),
(2), (4) Date: Feb. 12, 2015

(87) PCT Pub. No.: WO2013/038413
PCT Pub. Date: Mar. 21, 2013

(65) Prior Publication Data
US 2015/0145910 A1 May 28, 2015

Related U.S. Application Data

(60) Provisional application No. 61/534,910, filed on Sep. 15, 2011.

(51) Int. Cl.
*B41J 29/38* (2006.01)
*B41J 2/045* (2006.01)
*B29C 67/00* (2006.01)

(52) U.S. Cl.
CPC ......... *B41J 2/04588* (2013.01); *B29C 67/0059* (2013.01); *B41J 2/04508* (2013.01); *B41J 2/04573* (2013.01); *B41J 2/04581* (2013.01); *B41J 2/04591* (2013.01)

(58) Field of Classification Search
CPC . B41J 2/04581; B41J 2/04588; B41J 2/04591
See application file for complete search history.

(56) References Cited

U.S. PATENT DOCUMENTS

| | | | |
|---|---|---|---|
| 3,596,275 A | 7/1971 | Sweet | |
| 3,683,212 A | 8/1972 | Zoltan | |
| 5,192,559 A | 3/1993 | Hull et al. | |
| 6,165,406 A | 12/2000 | Jang et al. | |
| 2006/0127153 A1 | 6/2006 | Menchik et al. | |
| 2011/0085012 A1 | 4/2011 | Nishikawa et al. | |
| 2012/0287186 A1* | 11/2012 | Tanaka et al. | 347/10 |

FOREIGN PATENT DOCUMENTS

| CN | 101528822 | 9/2009 |
|---|---|---|
| CN | 1926470 | 6/2010 |

(Continued)

OTHER PUBLICATIONS

International Search Report for International Application No. PCT/IL2012/050367 mailing date Jan. 23, 2013.

(Continued)

*Primary Examiner* — Julian Huffman
(74) *Attorney, Agent, or Firm* — Pearl Cohen Zedek Latzer Baratz LLP

(57) ABSTRACT

A printing method includes controlling timing parameters for application of electrical pulses to a piezoelectric nozzle of an inkjet printing head so as to dispense droplets of a material from the nozzle. The timing parameters are controlled to introduce gas bubbles into the droplets of material so as to reduce the density of the material to a selected density value that is less than a natural density of the material.

19 Claims, 5 Drawing Sheets

(56) References Cited

FOREIGN PATENT DOCUMENTS

| | | |
|---|---|---|
| CN | 101874089 | 10/2010 |
| CN | 101495561 | 2/2013 |
| CN | 101665040 | 9/2013 |
| CN | 101616785 | 1/2014 |
| EP | 1609600 | 12/2005 |
| JP | 2008-194965 | 8/2008 |
| JP | 2008-238518 | 10/2008 |
| JP | 2006-130864 | 2/2011 |
| WO | WO-97/29148 | 8/1997 |
| WO | WO-2007/063695 | 6/2007 |

OTHER PUBLICATIONS

European Search Report of European Application No. 12 83 1895 mailed Jul. 24, 2015.

* cited by examiner

CONTROLLING DENSITY OF DISPENSED PRINTING MATERIAL

CROSS-REFERENCE TO RELATED APPLICATIONS

This application is a National Phase Application of PCT International Application No. PCT/IL2012/050367, International Filing Date Sep. 13, 2012, published as PCT International Patent Application Publication No. WO 2013/038413, claiming priority of U.S. Provisional Patent Application No. 61/534,910, filed Sep. 15, 2011, both of which are hereby incorporated by reference.

FIELD OF THE INVENTION

The present invention relates to printing using inkjet printing heads. More particularly, the present invention relates to controlling material density of material that is dispensed during printing.

BACKGROUND OF THE INVENTION

Three-dimensional (3D) printing is widely used for building objects, such as models or prototypes. In 3D printing, an object is constructed by deposition of material in a controlled manner so as to form the object. Instructions for guiding construction of the object may be derived from a digital representation of the object to be constructed. Such a digital representation may, for example, be generated by a computer-aided design or computer-aided manufacturing program or application.

Commonly used 3D printers use inkjet printing heads for selectively dispensing material such as photopolymer material. The photopolymer material is deposited layer-by-layer to form a 3D model. Different photopolymer materials may be deposited to form different parts of the object being printed. The photopolymer material may be stored in a liquid or gel form within the inkjet printing head. After the photopolymer material is dispensed by the inkjet printing head, the material may harden or may be cured (e.g. by exposure to light or ultraviolet radiation) in order to cause the material to harden.

An inkjet printing head may include piezoelectric elements. Application of an electrical pulse to a piezoelectric element may generate a pressure wave in the material that is within the printing head. The pressure wave may cause the printing head to jet or expel a drop of the material.

Under some circumstances, a pressure wave may form small cavities (cavitation) within the material. Components of the material may fill the formed cavities in a gaseous state to form gas bubbles within the material. Air bubble generation in ink-jet printing heads is a well-known phenomenon (see e.g., H. Wijshoff, "The dynamics of the piezoelectric inkjet printhead operation", Physics Reports, v. 491 (2010), pp. 77-177). Ink-jet printing heads are preferably used in conventional printing machines for two-dimensional printing. In such application bubble formation in ink drops is considered a parasitic or negative side-effect, and much effort is invested in order to suppress such bubble formation completely or significantly decrease it.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

Figure 1:
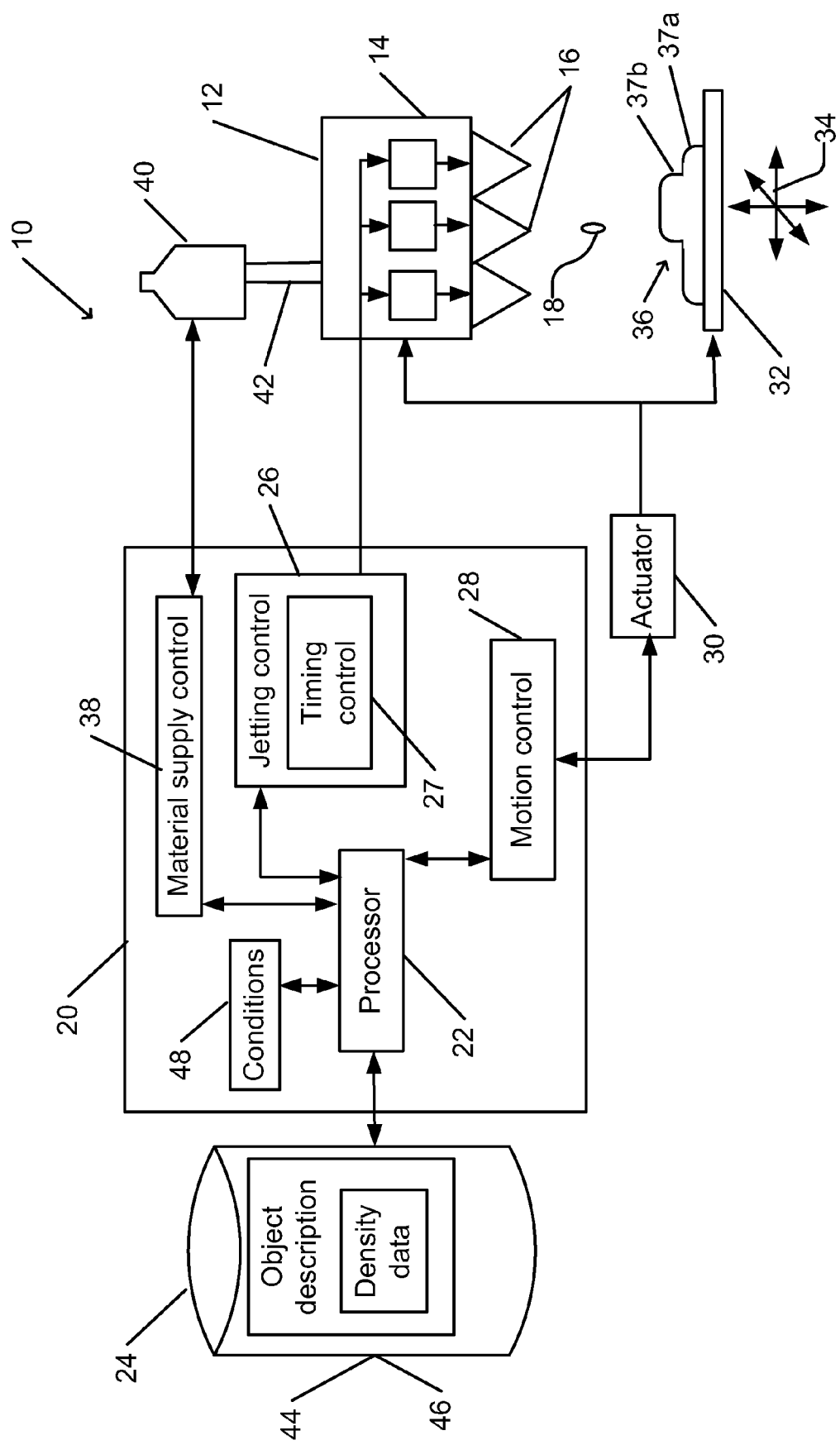
FIG. 1 is a schematic drawing of a three-dimensional printer that enables controlling density of a material that is dispensed during printing, in accordance with embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In accordance with embodiments of the present invention, a density of a material that is dispensed by a piezoelectric nozzle of an inkjet printing head is controllable. The printing head is incorporated into, or associated with, a printer. A droplet of the material is dispensed by a piezoelectric nozzle when an electrical pulse is applied to that nozzle. Application of the pulse causes formation of a pressure wave that ejects a droplet of material that is contained in the printing head. As a droplet is ejected, additional material flows in to the printing head. The combined action of generating pressure wave, dispensing droplets, and inflow of additional material may cause cavitation within the material. Cavitation within the material may thus increase gas bubble content of the material within the printing head.

The material may be dispensed for the purpose of 3D printing so as to form an object. A dispensed droplet of the material may be deposited on a surface so as to contribute to formation of the object. For example, the surface may be a substrate, tray, or platform on which the object is to be printed or formed. The surface may include a nearest (e.g. upper or top) surface of a partially formed object.

Controlling the density of the dispensed and deposited material thus enables formation of an object with a controllable density. Separately controlling the density of the material that is dispensed in order to form each layer, region, or component of the formed object enables formation of an object having one component whose density is different from that of another of the components.

The density of the material may be reduced from a natural density of the material by introduction of gas bubbles into the material. As used herein, a natural density of the material is defined as a density of the material (e.g. under a given set of environmental conditions, including temperature and pressure) when the material is contiguous and uninterrupted by gas bubbles. Thus, when the gas bubble content is close to zero, the density of the material is substantially equal to the natural density of that material. The greater the gas bubble content (e.g. expressible as a volume or mass fraction) of the material, the lower the density of the material. The gas bubbles may be entrapped in the material until, and following, hardening (e.g. as a result of curing) of the material.

Gas bubble content of material that is dispensed by a piezoelectric nozzle may be controlled by controlling application of a series of electrical pulses to that nozzle. By adjusting a timing of application of electrical pulses to the piezoelectric nozzle, formation of gas bubbles may be controlled. The timing is characterized by one or more timing parameters. At least a subset of the timing parameters is adjustable so as to control gas bubble content of the dispensed material. Adjustable parameters with regard to timing of electrical pulses may include duration of each of the pulses, or a period or time between consecutive pulses.

A period of time between one pulse and the next may be measured from a particular point of one pulse that is applied to a nozzle (e.g. the beginning of the pulse) to an equivalent point (e.g. the beginning) of the immediately subsequent pulse that is applied to that nozzle (during continuous operation of the printing head). In accordance with some embodiments of the present invention, the period of time, henceforth the pulse period, may be constrained by concurrently executed operations of the printer. For example, a relative motion between the printing head and a surface of substrate onto which the material is being dispensed may have a constant speed (e.g. always, or throughout formation of a single object or a single component of an object). In order to accurately form the object, a pulse frequency with which pulses are generated (the inverse of the pulse period, expressed, e.g., in units of pulses per second) may be constrained by coordination between dispensing the material and the relative motion. In accordance with other embodiments of the present invention, the relative motion may be adjustable in coordination with adjustment of the pulse frequency.

Duration of a single pulse, henceforth a pulse width, may be adjustable. When the pulse frequency or pulse period is fixed or constant, adjustment of the pulse width may be accompanied by a compensating adjustment of a pulse delay. For example, a pulse delay may describe the time interval between a constant (e.g. arbitrarily selected) point of the pulse period and the beginning of the pulse. A sum of the pulse width and its corresponding pulse delay (which may have a negative value) may thus be substantially constant for a particular fixed pulse frequency or period.

In accordance with some embodiments of the present invention, a relationship between electrical pulse timing and material density (or a related property of the material, such as translucency) may be empirically derived from experiments or observations. For example, determining an empirical relationship may include operating nozzles of the printing head to form an object while maintaining constant pulse timing (e.g. pulse width and period). The density of the formed object is then measured. Similar formation of objects with various pulse timings, measurement of their densities, and analysis of the results may yield an empirical relationship between pulse timing and material density (or a related property of the material, such as translucency or dielectric constant).

In accordance with some embodiments of the present invention, application of electrical pulses to one nozzle of a printing head may be coordinated with application of pulses to neighboring nozzles. For example, the coordination may prevent concurrent application of electrical pulses to two neighboring nozzles (e.g. nearest neighbors and next nearest neighbors). The nozzles may be allocated among a number of groups (e.g. three groups) of nozzles, each nozzle being a member of one of the groups. Electrical pulses may be applied concurrently to nozzles that are members of a single group. Pulses are applied to nozzles of one group during intervals between pulses that are applied to the other groups.

In accordance with some embodiments of the present invention, pulse timing may be characterized by a duty cycle. The duty cycle for a single nozzle (or group of nozzles) may be defined as the ratio of the pulse width to the pulse period. When application of electrical pulses is coordinated such that pulses are not concurrently applied to neighboring nozzles, a total duty cycle may be defined for those nozzles as a ratio to the pulse period of the sum of the pulses that are applied to all of those nozzles.

For example, when dispensing some materials such as acrylic-based photopolymers, for example Objet VeroClear™ RGD810 (Objet® Ltd., Rehovot, Israel), electrical pulses may be applied with a total duty cycle of 40%. Application of electrical pulses with a duty cycle of 40% or less may introduce sufficient gas bubbles into the dispensed material (e.g. about 10% by volume) to appreciably reduce (e.g. by about 10%) the density of dispensed material below the natural density of the material.

A relationship between one or more electrical pulse timing parameters and material density (or gas bubble content) may be represented by a lookup table or similar representation. For example, the lookup table may be indexed by material density. Thus, when a material having a particular density is to be dispensed, reference to the lookup table may yield a value of an electrical pulse timing parameter that yields dispensed material with that density. Alternatively to a lookup table, a relationship between a pulse timing parameter and material density may be represented as a function, formula, or equation. For example, a functional relationship may be derived from fitting empirically derived data to a functional form.

Reducing the density of a dispensed material below the material's natural density may be advantageous. For example, reducing the density of the dispensed material may enable formation of an object that is lighter than it would be were the material to be dispensed with its natural density. Depending on the material and on the object that is formed, reduction of the material density by introduction of gas bubbles may not appreciably affect mechanical strength or other mechanical properties of the formed object. Similarly, the amount of material needed to form the object may be reduced, thus reducing the cost of forming the object.

Although printing with different density materials could be accomplished by printing with different materials (e.g. by additional printing heads or by replacing the material that is provided to a printing head), such a solution could place a greater strain on resources (e.g. limited number of printing heads per material) or throughput (e.g. time required for replacing material supply container and associated actions). On the other hand, changing a pulse timing in accordance with embodiments of the present invention could be performed repeatedly during the course of the printing process without decreasing printing speed.

With some materials, introducing gas bubbles to reduce density may affect other properties of the dispensed material or of the formed object. For example, introduction of gas bubbles may affect the dielectric constant or other electromagnetic-related properties of the material. If the material is transparent, introduction of gas bubbles into the material may cause the material to become more translucent. (In such a case, a connection between translucency of the material and material density may enable determining or estimating the density of a dispensed material or a formed object by measuring or observing its translucency.) Objet VeroClear™ RGD810 (Objet Ltd., Rehovot, Israel) is one example of a material that is at least partially transparent in its natural density but becomes more translucent with the increase of gas bubble content.

FIG. 1 is a schematic drawing of a 3D printer that enables controlling density of a material that is dispensed during printing, in accordance with some embodiments of the present invention.

3D printer 10 includes a printing head 12 that may operate as controlled by controller 20. Printing head 12 includes a plurality of piezoelectric jetting units 14. Each piezoelectric jetting unit 14 may be operated by a jetting control module 26 of controller 20 to generate a sequence of electrical pulses that are applied to a piezoelectric actuator of that piezoelectric jetting unit 14. Application of the pulses to the piezoelectric actuator may generate a sequence of pressure waves in a printing material that is provided to a nozzle 16. Generation of the pressure wave in the printing material may cause that nozzle 16 to jet or dispense a droplet 18 of printing material. The density of the dispensed printing material may be determined by timing of the applied sequence of electrical pulses. The timing may be controlled by a timing control sub-module 27 of jetting control module 26.

Pulses may be applied concurrently to a plurality of piezoelectric jetting units 14. In order to inhibit dispensing of a drop 18 by one nozzle 16 from affecting dispensing of a drop from an adjacent or neighboring nozzle 16 (e.g. due to various mechanical, acoustical, or hydrodynamic effects), jetting control module 26 may be configured to avoid applying concurrent pulses to piezoelectric jetting units 14 of adjacent nozzles 16. In one arrangement, nozzles 16 are divided into three or more groups. Pulses are applied concurrently only to piezoelectric jetting units 14 of nozzles 16 of a single group. For example, when nozzles 16 are divided into three groups, every third nozzle 16 in a row of nozzles belong to a first group, the nozzles that immediately follow the nozzles of the first group belong to a second group, and the nozzles that immediately precede the nozzles of the first group belong to a third group. (For example, the three adjacent nozzles 16 that are shown schematically in FIG. 1 would each belong to a separate group, such that no two of the three nozzles 16 that are shown would dispense droplets 18 concurrently.) Thus, two nozzles 16 that dispense droplets concurrently are separated by at least two intervening nozzles 16 that are not dispensing droplets concurrently with the first two.

In some embodiments, all components of a piezoelectric jetting unit 14 are located in printing head 12. In other embodiments, some components of piezoelectric jetting unit 14 (e.g. some electrical circuitry) may be located outside of printing head 12, such as in controller 20.

Although 3D printer 10 is shown with a single printing head 12, a printer may include a plurality of printing heads. The various printing heads may be operated concurrently, e.g. to increase printing speed. Various printing heads may be configured to dispense different materials, e.g. to form different parts of printed object 36.

Material for dispensing may be provided to nozzles 16 of printing head 12 from material reservoir 40 via conduit system 42. (Conduit system 42 typically includes a plurality of branches, not shown in FIG. 1 for simplicity, that provide material from a common material reservoir 40 to a plurality of nozzles 16 of printing head 12.) Provision of material from material reservoir 40 to nozzles 16 via conduit system 42 may be controlled by material supply control module 38 of controller 20. An exemplary 3D printer may comprise a multiple cartridge supply unit (not shown) for supply of different materials to 3D printer reservoirs. Different materials may be supplied from different cartridges in the multiple cartridge unit, via a conduit system. Such supply unit is described for example in U.S. Pat. No. 7,725,209 of the same Assignee, and incorporated herein by reference.

Printing head 12 may be configured to dispense droplets 18 so as to form layers, such as layers 37a and 37b of a printed object 36. A droplet 18 may be deposited on the surface of a lower layer 37a of object 36, being printed, where it solidifies (or may be cured to solidify) to form at least part of a new upper layer 37b. The solidified material has a density that is determined by the density of material in droplet 18. Printed object 36 may be supported by support platform 32. Actuator 30 may be operated by motion control module 28 of controller 20 to cause relative translational or rotational motion between printing head 12 and support platform 32. For example, actuator 30 may be operated to move support platform 32, printing head 12, or both. The motion, indicated schematically by arrows 34 (henceforth motion 34), may include translational motion in a plane that is substantially parallel to support platform 32, may include translational motion that adjusts a distance between printing head 12 and support platform 32 (e.g. to maintain a substantially constant distance between a nozzle 16 and a nearest point of printed object 36, and thus a substantially constant layer thickness, as a height of printed object 36 grows as printed object 36 is formed by depositing dispensed droplets 18 of material), or may include a relative rotation between printing head 12 and support platform 32.

Conditions module 48 of controller 20 may control receive data from one or more sensors (e.g. thermometer, humidity sensor, flow sensor, or other optical, mechanical, or electromagnetic sensor) that indicate one or more environmental conditions (e.g. ambient temperature, humidity, coolant flow, coolant composition) in printing head 12, or in another enclosure or component of 3D printer 10. Conditions module 48 may control one or more environmental control devices (e.g. heater, fan, or filter) to control one or more of the environmental conditions. Conditions module 48 may be configured to generate an alert (e.g. visible or audible), or halt or pause operation of 3D printer 10, or both, when one or more of the sensed environmental conditions deviate from a predetermined range. The alert may indicate to an operator to perform a corrective action (e.g. change filter, replenish material, reset switch) to restore the environmental condition to an acceptable value.

Controller 20 includes a processor 22, and one or more modules. Processor 22 may include one or more processing devices. All or some components of processor 22 may be incorporated in printer 10, or may be incorporated in a computer or external control unit that is in communication with printer 10. Processor 22 may operate in accordance with programmed instructions.

In accordance with some embodiments of the present invention, a module of controller 20, such as jetting control module 26, motion control module 28, material supply control module 38, or conditions module 48, may include circuitry for enabling execution of a function of the module. In accordance with some embodiments, a module of controller 20 may include a program, application, or set of programmed instructions that is configured to be executed by processor 22 so as to enable execution of a function of the module.

Processor 22 of controller 20 may communicate with data storage unit 24. Data storage unit 24 may include one or more volatile or non-volatile data, fixed or removable, data storage devices. Data storage unit 24 may include a non-volatile computer readable data storage medium. Data storage unit 24 may include one or more component data storage devices that are incorporated into controller 20 or 3D printer 10. Data storage unit 24 may include one or more component data storage devices that are separate or remote from controller 20. In this case, processor 22 may communicate with a remote component of data storage unit 24 via a data communications channel or network.

Data storage unit 24 may be utilized to store programmed instructions for operation of processor 22 or controller 20. The stored programmed instructions may include instructions for operation one or more modules of controller 20, such as jetting control module 26, motion control module 28, material supply control module 38, or conditions module 48.

Data storage unit 24 may be utilized to store data or parameters for controlling operation of 3D printer 10 to form a printed object 36. For example, data storage unit 24 may be utilized to store object description 44.

In accordance with some embodiments of the present invention, object description 44 may include a digital representation of an object to be formed or printed by 3D printer 10. For example, a digital representation may include a three-dimensional array of volume elements. Each volume element may include information that specifies a composition at a three-dimensional location of the object (e.g. as specified in an appropriate three-dimensional coordinate system). Object description 44 may be obtained and interpreted by processor 22. On the basis of object description 44, processor 22 may generate a sequence of instructions for execution by, for example, jetting control module 26, motion control module 28, or material supply module 38. Execution of the generated instructions may control operation of components of 3D printer 10, such as one or more printing heads 12 or an actuator 30 so as to form printed object 36.

In accordance with some embodiments of the present invention, object description 44 may include a sequence of instructions for execution by, for example, jetting control module 26, motion control module 28, or material supply module 38. Execution of the generated instructions may control operation of components of 3D printer 10, such as one or more printing heads 12 or an actuator 30 so as to form printed object 36.

Object description 44 may include density data 46. If object description 44 includes a digital representation of the object to be formed, density data 46 may specify a density of an element of the digital representation. Density data 46 may specify a density of an element of printed object 36 (e.g. after deposited material has solidified), or a density of material in a droplet 18 that is to be dispensed in order to form that element. If object description 44 includes a instructions for execution by modules of controller 20 so as to form printed object 36, density data 46 may include instructions for execution by timing control sub-module 27 of jetting control module 26. Execution of the instructions may cause jetting control module 26 to control electrical pulse timing of piezoelectric jetting unit 14 such that a nozzle 16 dispenses a droplet 18 having the desired density.

In one embodiment, in order to introduce and test different amounts of gas bubbles inside the built 3D model, plano-parallel samples of approximately 1 cm thickness were printed from a transparent photopolymer Objet VeroClear™ RGD810 jetted by an ALARIS™ 3D printer, (both of Objet® Ltd., Rehovot, Israel) using different jetting frequencies and different combinations of pulse widths and delays for patterning of the electric signal feeding the printing head. Different building conditions resulted in different and varying gas bubble content and in turn, in different levels of translucency, as described and schematically illustrated in the following figures.

Figure 2A:
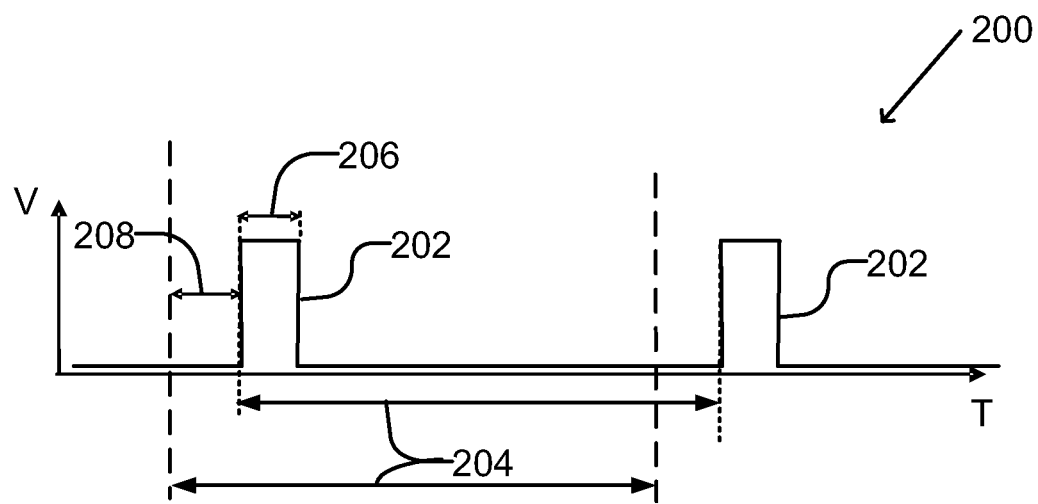
FIG. 2A illustrates electrical pulse generation with a low duty cycle for a single nozzle, in accordance with embodiments of the present invention.
Figure 2B:
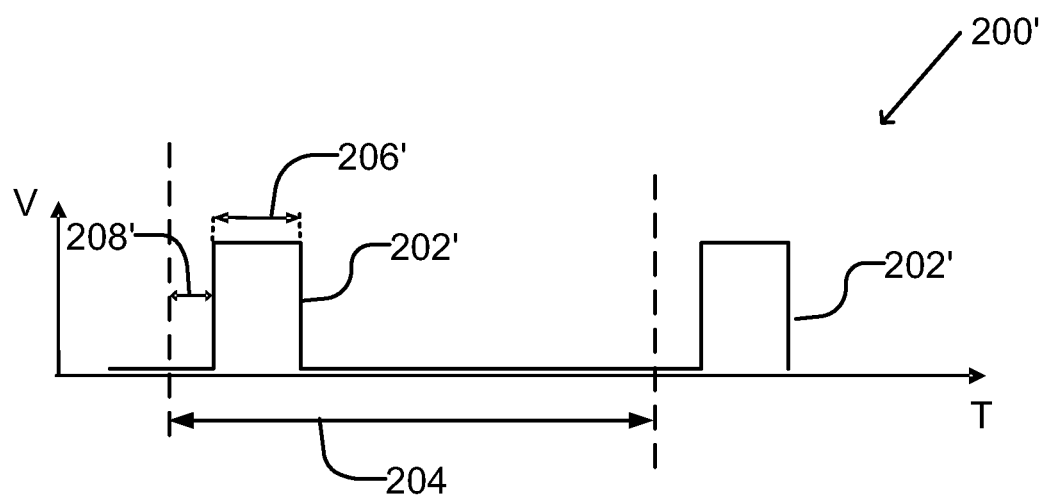
FIG. 2B illustrates electrical pulse generation with a high duty cycle for a single nozzle, in accordance with embodiments of the present invention.

FIGS. 2A and 2B schematically illustrate control of electrical pulse generation for a single nozzle 16.

FIG. 2A illustrates electrical pulse generation with a low duty cycle for a single nozzle, in accordance with embodiments of the present invention. The duty cycle of electrical pulse generation as illustrated in FIG. 2A is low as compared with the duty cycle of electrical pulse generation as illustrated in FIG. 2B. Application of pulses with a low duty cycle may result in increased gas bubble content, and reduced density, of dispensed material.

Graph 200 illustrates application of an electrical signal of voltage V to a piezoelectric element of a nozzle of printing head as a function of time T. As shown in graph 200, the applied voltage is approximately zero except when electrical pulses 202 are generated. Pulse period 204 is the time interval between successive consecutive applications of pulses 202 to the nozzle. Pulse period 204 (the inverse of the pulse frequency) may be determined by one of more factors. For example, pulse period 204 may be related to synchronization of application of pulses 202 with relative motion between the printing head and a printed object being formed.

Pulse width 206 represents the time that a pulse 202 is applied. For example, pulse width 206 may represent the full width at half maximum of a pulse 202.

Pulses may be concurrently applied to a plurality of nozzles of the printing head. For example, during a time interval between the end of a first pulse 202 and an immediately following pulse 202 that are applied to a single nozzle (or group of nozzles) pulses may be applied to other nozzles. Thus, application to pulses to other nozzles between consecutive application of pulses to a single nozzle may constrain a duty cycle.

FIG. 2B illustrates electrical pulse generation with a high duty cycle for a single nozzle, in accordance with embodiments of the present invention. The duty cycle of electrical pulse generation as illustrated in FIG. 2B is high as compared with the duty cycle of electrical pulse generation as illustrated in FIG. 2A. Application of pulses with a low duty cycle may result in increased gas bubble content, while application pulses with the high duty cycle may give a density of dispensed material that is close to the natural density of the material.

As shown in graph 200', the applied voltage is approximately zero except when electrical pulses 202' are generated. Pulse period 204 is the time interval between successive consecutive applications of pulses 202' to the nozzle. Pulse width 206' represents the time that a pulse 202' is applied.

When pulse period 204 is fixed or constrained to a constant value, the sum of pulse width 206 and pulse delay 208 of graph 200 is equal to the sum of pulse width 206' and pulse delay 208' of graph 200'.

Figure 3A:
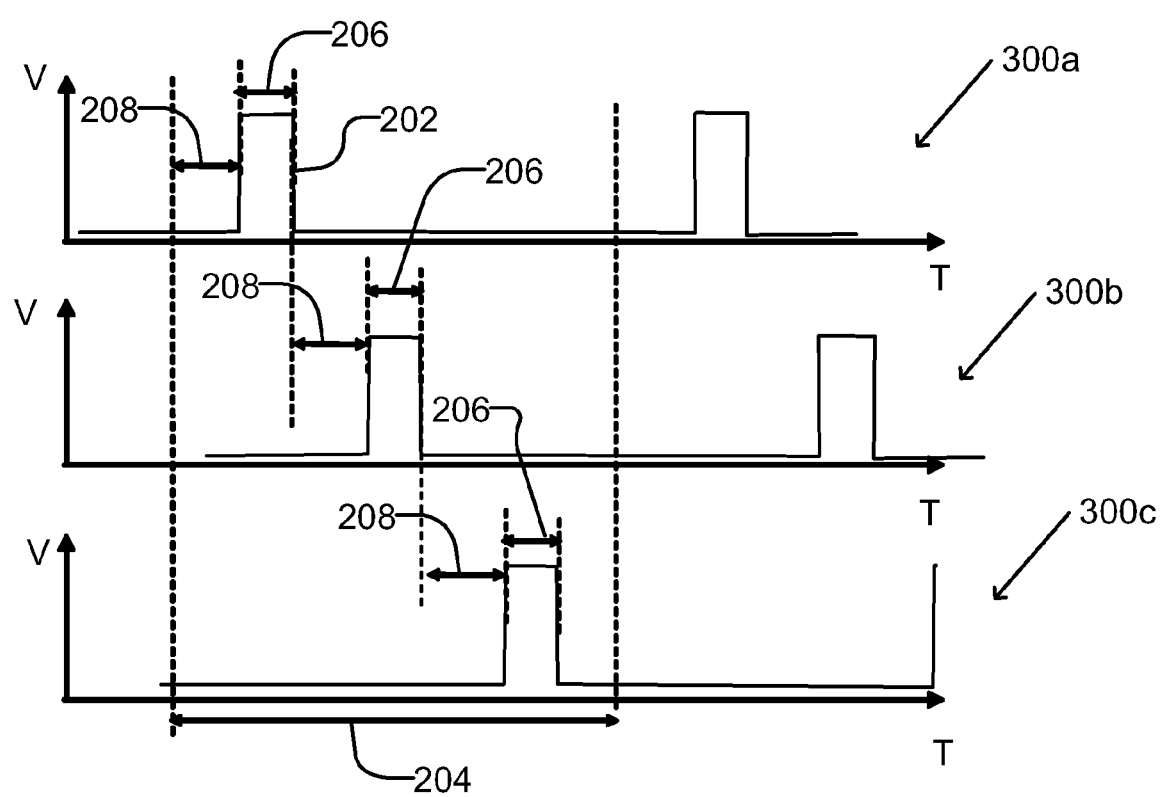
FIG. 3A illustrates electrical pulse generation with the duty cycle of FIG. 2A for three groups of nozzles, in accordance with embodiments of the present invention.

FIG. 3A illustrates electrical pulse generation with the duty cycle of FIG. 2A for three groups of nozzles, in accordance with embodiments of the present invention.

Graphs 300a, 300b and 300c represent, respectively, application of electrical pulses 202 to nozzles of three different groups. For example, graphs 300a, 300b and 300c may represent application of electrical pulses 202 to three adjacent nozzles of a printing head. As shown in FIG. 3A, pulse delay 208 represents a time delay between applications of pulses 202 to nozzles in different groups. For example, after a pulse 202 is applied to a nozzle corresponding to graph 300a, another pulse 202 is applied to a nozzle corresponding to graph 300b after pulse delay 208.

For example, in FIGS. 2A and 3A, pulse width 206 may be approximately 4 microseconds. Pulse delay 208 may be approximately 5 microseconds. Pulse period 204 may be approximately 33 microseconds, corresponding to a jetting or pulse frequency of about 30 kilohertz. Thus, the duty cycle for each nozzle is about 12%, and the total duty cycle is approximately 36%. When dispensing a typical acrylic-based photopolymer with such pulse timing, gas bubble content is significantly increased (e.g. about 10%), and the density of the dispensed material is correspondingly decreased (to about 89% of the natural density). Under such conditions, a transparent acrylic-based photopolymer may appear to be opaque.

Figure 3B:
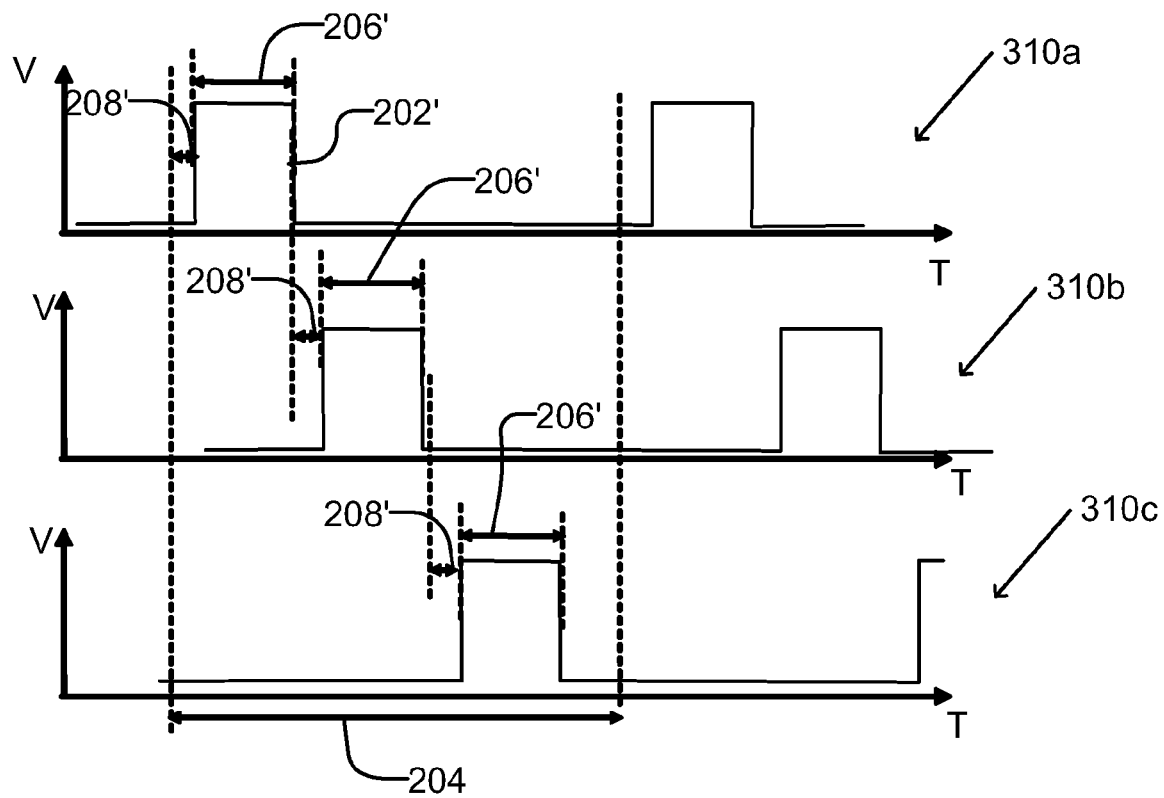
FIG. 3B illustrates electrical pulse generation with the duty cycle of FIG. 2B for three groups of nozzles, in accordance with embodiments of the present invention.

FIG. 3B illustrates electrical pulse generation with the duty cycle of FIG. 2B for three groups of nozzles, in accordance with embodiments of the present invention.

Graphs 310a, 310b and 310c represent, respectively, application of electrical pulses 202' to nozzles of three different groups. Pulse delay 208' represents a time delay between applications of pulses 202' to nozzles in different groups. The duty cycle shown in FIG. 3B is close to maximal. Thus, pulses 202' are being applied to one of the groups of nozzles almost all of the time.

For example, in FIGS. 2B and 3B, pulse width 206' may be approximately 7 microseconds. Pulse delay 208' may be approximately 1 microsecond. Pulse period 204 may be approximately 33 microseconds, corresponding to a jetting or pulse frequency of about 30 kilohertz. Thus, the duty cycle for each nozzle is about 21%, and the total duty cycle is approximately 63%. When dispensing a typical acrylic-based photopolymer with such pulse timing, gas bubble content is close to zero (e.g. less than 0.1%) and the density of the dispensed material is close to the natural density.

Although in each of FIGS. 3A and 3B all of the pulses of all of the groups are shown as having a single pulse width (206 and 206', respectively) and single pulse delay (208 and 208', respectively), the pulse widths and pulse delays may be different for different groups.

A controller may be configured to operate a printer in accordance with a method for controlling density of a dispensed printing material. In particular, a controller of a 3D printer may be configured to operate in accordance with the method.

Figure 4:
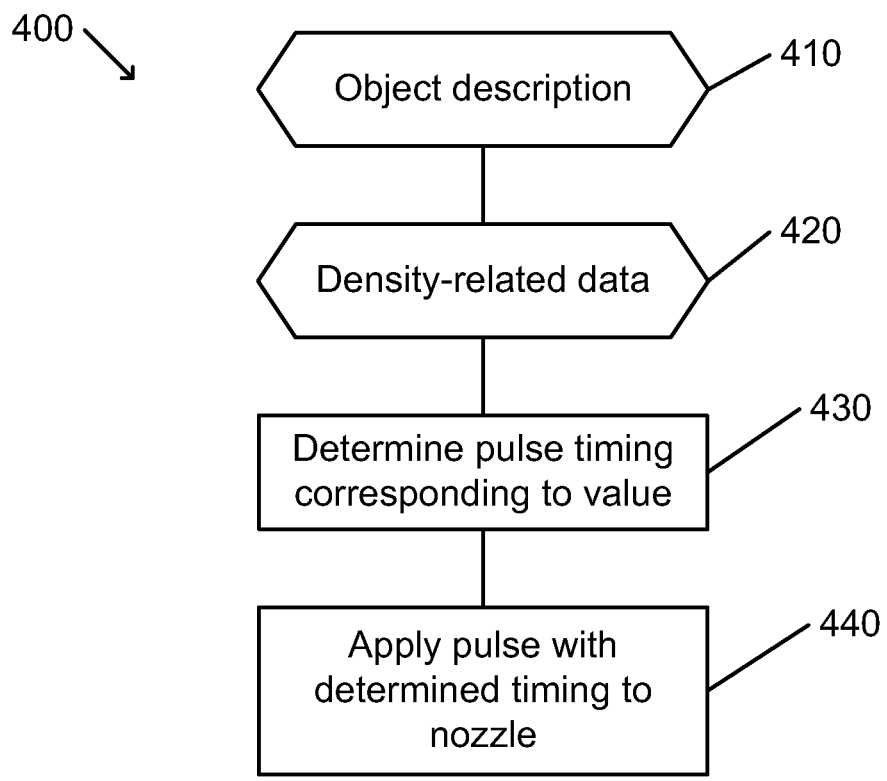
FIG. 4 is a flowchart of a method for controlling density of a dispensed printing material, in accordance with embodiments of the present invention.

FIG. 4 is a flowchart of a method for controlling density of a dispensed printing material, in accordance with embodiments of the present invention. (Reference is also made to components shown in FIG. 1.)

It should be understood with respect to the flowchart that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the present invention.

Similarly, it should be understood that, unless indicated otherwise, the illustrated order of execution of the operations represented by blocks of the flowchart has been selected for convenience and clarity only. Operations of the illustrated method may be executed in an alternative order, or concurrently, with equivalent results. Such reordering of operations of the illustrated method should be understood as representing other embodiments of the present invention.

Density control method 400 may be executed by a controller such as controller 20, or a processor of a controller such as processor 22, of 3D printer 10.

A description of an object to be formed by printing may be obtained (block 410). The description may be obtained from a data storage unit 24 that is associated with a controller 20, or that may be communicated with by a controller 20. The description may include a digital representation of an object to be formed. The description may be analyzed to yield a listing of operations to be performed. Alternatively, obtained description may include a listing of operations to be performed to as to form the object.

Density-related data may be obtained (block 420). The density-related data may specify a density-related property of all or part of an object to be formed. A density-related property may include the density of the material to be dispensed by a nozzle 16, or the density of the object to be formed (e.g. after the material has solidified), or of a region, part, or component of the object. A density-related property may include a relative density (e.g. fraction of natural density or specific gravity) of the material or object. A density-related property may include a mass of a dispensed droplet of the material, or a gas-bubble content of the material or object. A density-related property may include a property that may be correlated with the density of the material or object. Such a property may include, for example, a translucency, optical density, tensile strength, or dielectric constant.

A pulse timing that corresponds to the density-related data may be determined (block 430). For example, pulse timing may be obtained from a lookup table or functional relationship that relates a density-related property to one or more characteristics of the pulse timing. A characteristic of pulse timing may include a pulse frequency or pulse period, a pulse width, a pulse delay, a duty cycle for a single nozzle or group of nozzles, or a total duty cycle for a plurality of groups of nozzles.

Additional factors may be taken into account in determining a pulse timing characteristic. For example, synchronization with a relative motion between printing head 12 on the one hand, and an object being printed or a support platform 32 on the other, may affect determination of a pulse frequency or pulse period.

For example, a pulse frequency may be coordinated with a speed of the relative motion in order to enable a predetermined rate of material deposition. For example, if the deposition rate is 100 drops per millimeter, a pulse frequency of 22 kilohertz corresponds to a relative motion of 220 millimeters per second. With the same deposition rate, a pulse frequency of 33 kilohertz corresponds to a relative motion of 300 millimeters per second.

An electrical pulse, typically part of a series of electrical pulses, is applied to a piezoelectric jetting unit 14 of a nozzle 16 in accordance with the determined pulse timing (block 440). Application of the electrical pulses may cause a plurality of droplets 18 of material to be dispensed by the associated nozzle 16. The gas bubble content, and thus the density, of each dispense droplet 18 is determined by the pulse timing.

Concurrent relative motion between printing head 12 and support platform 32 with dispensing of droplets 18 of controlled density may cause the dispensed material to be deposited in the form of a straight or curved line on an object being formed, such as printed object 36. Concurrent dispensing of material by other nozzles 16 or printing heads 12 (or a transverse or other additional relative motion between printing head 12 and support platform 32) may cause a region, area, or layer of material of controlled density to be deposited on the printed object 36.

EXAMPLE

As discussed above, a relationship between gas bubble content and pulse timing may be determined empirically. The example below illustrates an empirical determination of gas bubble content when printing a 3D model.

In order to introduce different amounts of gas bubbles inside the 3D model and to measure the gas bubble content, plano-parallel samples of approximately 1 cm thickness were printed from a transparent photopolymer, Objet Vero Clear™ RGD810, and jetted by an ALARIS™ 3D printer (both of Objet® Ltd., Rehovot, Israel). Different jetting (pulse) frequencies and different combinations of pulse widths and pulse delays were used in patterning the electric signal that was applied to a piezoelectric element of the printing head. Tested pulse timing pattern and changeable parameters are depicted schematically in FIGS. 3A and 3B.

Different building conditions (pulse timing) result in different and varying gas bubble content and, in turn, in different levels of translucency of the model.

The inkjet printing head employed piezoelectric elements for transformation of electrical pulses into pressure waves inside the working volume of the head. The common prior art practice is to maximize the volume of an ejected drop for a given amplitude (e.g. height of pulse 202, as graphed in FIG. 3A) of the pulse. This approach results in the widest possible pulse (e.g. the maximum pulse width 206' in FIG. 3B), while pulse delays (e.g. pulse delays 208' in FIG. 3B) are set to a minimal value that avoids overlapping in time of consecutive pulses. For the printing heads tested, the typical timing parameters include a pulse width of 7.0 microseconds and a pulse delay of 1.0 microsecond. The pulse width is longer than the pulse delay for commonly used pulse timing parameters.

In one embodiment, an increased (e.g. significantly larger than minimal) gas bubbles content was introduced into the jetted material by intentionally changing pulse timing parameters from the commonly used values. Gas bubble content was measured by measuring the material density of the printed model. The density of gas in the bubble is negligibly small compared to the density of the jetted liquid. Thus a ratio of the density of the material containing bubbles (material A) with respect to the (natural) density of the same material without bubbles (material B) may be assumed to equal the volume fraction of gas bubbles in the material A.

In the most common operation mode recommended by the printing head manufacturer, the electrical pulse widths (206' in FIG. 3B, the same for all jets) are 7.0 microseconds, the pulse delays (208' in FIG. 3B, the same for all jets) are 1.0 microsecond, and the jetting frequency is 30 kHz. The pulses are applied separately to three groups of nozzles. A jetting frequency of 30 kHz corresponds to a pulse period 204 (in FIG. 3B) of 33.3 microseconds. Thus, in a single pulse period, pulses are applied for a total time of 21 microseconds (sum of the pulse widths for all three groups of nozzles), approximately 63% of the pulse period. The value of the total duty cycle (as a fraction of the pulse period during which electrical pulses are supplied to nozzles) is usually maintained as high as possible in order to increase the mass of the jetted drops. Under such conditions, a certain content of gas bubbles is observed in the material and the material appears to be translucent to an extent.

When an electrical pulse width 206' (FIG. 3B, the same for all nozzles) of 7.5 microseconds, a pulse delay 208' (FIG. 3B, the same for all jets) of 4.5 microseconds and a jetting frequency of 22 kHz are used, the gas bubble content of the material is very small and the material appears completely transparent.

When an electrical pulse width 206 (in FIG. 3A, the same for all jets) of 4.0 microseconds, a pulse delay 208 (in FIG. 3A, the same for all jets) of 5.0 microseconds, and a jetting frequency of 30 kHz are used, the material appears completely opaque. Such a pulse timing with the pulse delay larger than the pulse width is in contrast with the pulse timing known in the prior art. With typical prior art pulse timing, the pulse delay is set to a low value, and the pulse width to a high value in order to provide a sufficiently high mass of drops of materials ejected from the printing head.

Use of non-standard combinations (e.g. pulse width of 4.0 microseconds, pulse delay of 5.0 microseconds, and jetting frequency of 30 kHz; or pulse width of 7.5 microseconds, pulse delay of 4.5 microseconds, and jetting frequency of 22 kHz) decreases the mass of material drops that are ejected from the printing head to an extent (5-8%) with respect to the values obtained with the commonly used set of parameters (pulse width of 7.0 microseconds, pulse delays of 1.0 microseconds, and jetting frequency of 30 kHz). This decrease is caused by presence of the gas bubbles in the drops. The density of the built (solidified) material decreases to the same extent.

The density of material samples printed using different values of frequency and pulses was calculated. The samples were rectangular blocks of material, with the following dimensions: 40 mm×40 mm×10 mm. The dimensions of the blocks were measured with the digital Fowler ProMax Caliper IP67 (Fred V. Fowler Company, USA) with an accuracy of 0.01 mm. Their weight was determined with the analytical balance AB204-S of Mettler Toledo (Mettler-Toledo, Sweden) with an accuracy of 0.0001 g. The results are displayed in Table 1.

Table 1: The density values of Objet VeroClear RGD810 material jetted at different pulse and frequency values.

TABLE 1

The density values of Objet VeroClear RGD810 material jetted at different pulse and frequency values.

| Parameter | 1st working point | 2nd working point |
|---|---|---|
| Jetting frequency, kHz | 30 | 22 |
| Pulse width, microseconds | 4 | 7.5 |
| Pulse delay, microseconds | 5 | 4.5 |
| Density, g/cm 3 | 1.26 | 1.41 |

As can be seen from Table 1, samples built at the 1st working point have a density that is about 10% lower than samples built at the 2nd working point. Careful microscopic examination indicated that samples built at the 2nd working point did not contain air bubbles. Thus, samples built at the 1st working point have an air bubble content of 10%.

An embodiment of the present invention may be used for building a model with significantly increased gas bubble content (decreased density) for the purpose of saving photopolymer material. From the data described in table 1, it may be concluded that running the print head with the parameters of electrical pulses having a width of 4.0 microseconds, a delay of 5.0 microseconds with a jetting frequency of 30 kHz provides the introduction of 10% gas bubbles into the photopolymer. This extremely high gas bubble content may be obtained when the pulse delay exceeds the pulse width, i.e., only at a duty cycle below approximately 40%.

Changing the set of parameters of the electrical pulses feeding the printing head (width, delay and frequency) may be done rapidly, between printing of adjacent or subsequent slices or layers during the building of the 3D model. It enables the printing of several models or several model parts during a single building process and using a single building material, where the material forming each model or each model part has its own different gas bubble content, without necessitating replacement or change of building material.

It would be evident to a person skilled in the art that change of the jetting frequency requires an appropriate change of speed of printing head motion in a direction of motion (the X-direction) in order to provide the required rate of material deposition. For example, for a deposition rate of 100 dpm (drops per mm), a jetting frequency of 22 kHz corresponds to a printing head motion with a speed of 220 mm/sec, while a jetting frequency of 33 kHz corresponds to a printing head motion with a speed of 300 mm/sec It has been shown that variation of the timing parameters of the electrical pulses that are applied to the printing head (e.g. their width, delay and frequency) enables the generation not only of two extreme values (negligibly small (<0.1%) and quite large (~10%) gas bubble content within the jetted material, but also the ability to obtain some intermediate values.

A second embodiment of the present invention may be used for building of at least two models on a single tray or support platform, where one model is to have a very small gas bubble content and the material of the second model is to have an intermediate gas bubble content. All models may be built using a single material, e.g., using Objet VeroClear RGD810 on the ALARIS 3D printer (Objet Ltd., Israel).

From the data described herein it may be understood that layers or areas of a model according to the first embodiment of the present Example may be built with a printing head motion speed of 220 mm/sec (jetting frequency 22 kHz), and electrical pulse parameters of width: 7.5 microseconds and delay: 4.5 microseconds. Layers or areas belonging a model according to the second embodiment of the present Example may be built with a motion speed of 220 mm/sec (jetting frequency 22 kHz), and electrical pulses parameters of: width 4.0 microseconds and delay 5.0 microseconds. The areas of both types may built with the same jetting frequency i.e., using the same motion speed of the printing head.

As described herein, models having a very small gas bubble content appear to be transparent, while models having a significant gas bubble content appear to be translucent. Thus two models may be printed on the same tray, during the same printing process and using the same material, but with one model being transparent and the second having a translucent appearance.

Control of the timing parameters of the electrical pulses that are applied to the printing heads may be done according to the required gas bubble content. In other cases, for example when building using a transparent photopolymer material, but where different values of translucency are required in the different models (or in different parts of the same model), the control may be carried out directly in accordance with the required values of translucency, e.g., according to calibration tables or curves. Determination of the pattern of electrical pulses corresponding to the required distribution of gas bubble content (or translucency—in the case of a transparent photopolymer) may be done prior to the building process, and optionally outside the printing system.

Thus, in another embodiment, the step of determination of the pattern of electrical pulses corresponding to the required distribution of translucency is performed outside the machine and before the building process. In this case building commences with a predetermined pulse timing.

In accordance with an additional embodiment, two models may be built in a single printing process on the same printing surface or tray, and using a single provided material, where the first model is to be completely transparent, and the second completely opaque. From the data described hereinabove, one can understand that the areas belonging to the first model may be built with a motion speed of 220 mm/sec (jetting frequency 22 kHz), and electrical pulse parameters of: width 7.5 microseconds and delay 4.5 microseconds; and the areas belonging to the second model may be built with motion speed of 300 mm/sec (jetting frequency 30 kHz), and electrical pulse parameters of: width 5.0 microseconds and delay 3.0 microseconds. Thus printed layers where both area types are present within the same layer on the printing surface may be built in two passes of the printing head over the tray, one pass with a printing head motion speed corresponding to the jetting frequency of the areas of the transparent model, and the second pass with printing head motion speed corresponding to the jetting frequency of the areas of the translucent model. Printed layers on the tray comprising areas of only one of the two models may be built in single passes, with the printing head motion speed corresponding to the relevant level of translucency (or transparency) of the relevant model.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

The invention claimed is:

1. A printing method comprising controlling a timing parameter for application of electrical pulses to a piezoelectric actuator associated with a nozzle of an inkjet printing head so as to dispense droplets of a material from the nozzle, the timing parameter being controlled to introduce gas bubbles into the material in the droplets so as to reduce the density of the material in the droplets to a selected density value that is less than a natural density of the material.

2. The method of claim 1, wherein the timing parameter is selected from a list of timing parameters consisting of a pulse period, a pulse width, a pulse delay, a duty cycle, or a total duty cycle.

3. The method of claim 2, wherein controlling the timing parameter comprises adjusting the total duty cycle to a value that is 40% or less.

4. The method of claim 1, wherein controlling the timing parameter comprises selecting a value of the timing parameter in accordance with a predetermined correspondence between the timing parameter and a density-related property of the material.

5. The method of claim 4, wherein the density-related properties is selected from a list of density-related properties consisting of density of the material, density of the material after hardening, translucency, optical density, and dielectric constant.

6. The method of claim 1, wherein the material comprises a three-dimensional printing material that is configured to harden to form a region of a printed object.

7. The method of claim 1, wherein controlling the timing parameter comprises selecting a value of the timing parameter that corresponds to a relative motion between the printing head and a surface on which the dispensed droplets are to be deposited.

8. The method of claim 1, further comprising adjusting a speed of a relative motion between the printing head and a surface on which the dispensed droplets are to be deposited so as to correspond to a selected value of the timing parameter.

9. The method of claim 1, further comprising applying the pulses to the actuator in accordance with the controlled timing parameter.

10. The method of claim 9, wherein application of the pulses comprises concurrently applying the pulses to piezoelectric actuators associated with a plurality of nozzles of the printing head separated from one another by at least one other nozzle.

11. A three-dimensional printer comprising a controller that is configured to apply electrical pulses to a piezoelectric actuator associated with a nozzle of a printing head, the pulses being characterized by a timing parameter that is controlled by the controller, a value of the timing parameter being selected so as to cause droplets of a material to be dispensed by the nozzle, the material in the droplets having a selected density value that is less than a natural density of the material.

12. The printer of claim 11, further comprising the printing head, the printing head including the nozzle.

13. The printer of claim 11, wherein the controller is configured to select the timing parameter from a list of timing parameters consisting of a pulse period, a pulse width, a pulse delay, a duty cycle, or a total duty cycle.

14. The printer of claim 11, wherein the controller is configured to adjust the total duty cycle to a value that is 40% or less.

15. The printer of claim 11, wherein the controller is configured to select a value of the timing parameter in accordance with a predetermined correspondence between the timing parameter and a density-related property of the material.

16. The printer of claim 15, wherein the controller is configured to select the density-related property from a list of density-related properties consisting of density of the material, density of the material after hardening, translucency, optical density, and dielectric constant.

17. The printer of claim 11, wherein the controller is configured to select a value of the timing parameter that corresponds to a relative motion between the printing head and a surface on which the dispensed droplets are to be deposited.

18. The printer of claim 11, configured to enable relative motion between the printing head and a surface on which the droplets are to be deposited, so as to cause a line or curve of the material having the selected density value to be deposited on the surface.

19. A printing method comprising dispensing droplets of material from a piezoelectric nozzle of an inkjet printing head while controlling a density of the dispensed material and controlling formation of gas bubbles within the droplets by selecting a ratio of a duration of each of a plurality of electrical pulses that are applied to a piezoelectric actuator associated with the nozzle to expel the droplets, to an interval between successively applied pulses of the plurality of pulses, and by applying the pulses to the piezoelectric actuator in accordance with the selection.

* * * * *